United States Patent
Fahrbach (10) Patent No.: US 11,598,944 B2
(45) Date of Patent: Mar. 7, 2023

(54) LIGHT SHEET MICROSCOPE AND METHOD FOR IMAGING AN OBJECT

(71) Applicant: Leica Microsystems CMS GmbH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 178 days.

(21) Appl. No.: 17/242,377

(22) Filed: Apr. 28, 2021

(65) Prior Publication Data
US 2021/0341718 A1 Nov. 4, 2021

(30) Foreign Application Priority Data
May 4, 2020 (EP) .................................. 20172752

(51) Int. Cl.
*G02B 21/00* (2006.01)
*G01N 21/64* (2006.01)
*G02B 21/36* (2006.01)

(52) U.S. Cl.
CPC ..... *G02B 21/0076* (2013.01); *G01N 21/6458* (2013.01); *G02B 21/367* (2013.01)

(58) Field of Classification Search
CPC .. G02B 21/0076; G02B 21/367; G02B 21/00; G02B 21/0004; G02B 21/002; G02B 21/0024; G02B 21/0032; G02B 21/0052; G02B 21/006; G02B 21/06; G02B 21/36; G02B 21/361; G01N 21/6458; G01N 21/6456

USPC ....... 359/368, 362, 363, 369, 381, 384, 385, 359/388, 389, 390, 433

See application file for complete search history.

(56) References Cited

U.S. PATENT DOCUMENTS

| | | | |
|---|---|---|---|
| 2015/0177506 A1 | 6/2015 | Nishiwaki | |
| 2017/0269345 A1* | 9/2017 | Siebenmorgen | ....... G02B 21/14 |
| 2019/0056579 A1 | 2/2019 | Kalkbrenner et al. | |
| 2019/0170995 A1 | 6/2019 | Siebenmorgen | |
| 2020/0096752 A1* | 3/2020 | Kalkbrenner | ......... G02F 1/1313 |

(Continued)

FOREIGN PATENT DOCUMENTS

| | | |
|---|---|---|
| DE | 102007017598 A1 | 10/2008 |
| DE | 102016212020 A1 | 1/2018 |
| DE | 102005027077 B4 | 2/2018 |

(Continued)

*Primary Examiner* — Arnel C Lavarias
(74) *Attorney, Agent, or Firm* — Leydig, Voit & Mauer, Ltd.

(57) ABSTRACT

A light sheet microscope includes an object slide, and optical illumination and detection systems. The optical illumination system includes an illumination objective configured to illuminate a first object plane that is oblique relative to a slide plane with a light sheet. The optical detection system includes a detection objective and an image sensor device. The image sensor device is configured to define a first image plane which is orthogonal to an optical axis of the detection objective and to define a second image plane which is tilted relative to the first image plane. The detection objective is configured to image a focal plane onto the first image plane and to image a second object plane of the object onto the second image plane, the focal plane being coincident with the first object plane, and the second object plane being parallel to or coincident with the slide plane.

16 Claims, 5 Drawing Sheets

(56) References Cited

U.S. PATENT DOCUMENTS

2022/0260821 A1\* 8/2022 Glaser .................... G02B 21/33

FOREIGN PATENT DOCUMENTS

| WO | WO 2010/012980 A1 | 2/2010 |
| WO | WO 2020/001938 A1 | 1/2020 |

\* cited by examiner

LIGHT SHEET MICROSCOPE AND METHOD FOR IMAGING AN OBJECT

CROSS-REFERENCE TO PRIOR APPLICATION

Priority is claimed to European Patent Application No. EP 20172752.6, filed on May 4, 2020, the entire disclosure of which is hereby incorporated by reference herein.

FIELD

The present invention relates to a light sheet microscope and a method for imaging an object.

BACKGROUND

In light sheet microscopy only a thin slice of an object is illuminated by a so-called light sheet being formed by an illumination light distribution which is approximately planar in the object region to be imaged. The illuminated slice of the sample, hereinafter simply referred to as illuminated plane, usually has a thickness of a few hundred nanometers to a few micrometers. Thus, light sheet microscopy allows optical sectioning by reducing out-of-focus light. Further, the amount of incident illumination light which may harm sensitive biological samples can be drastically reduced. Light sheet microscopy combines the benefits of widefield fluorescence imaging as in particular faster imaging speed with an optical sectioning capability known from non-widefield approaches as for example confocal imaging.

According to a basic light sheet setup, the object is illuminated perpendicular to the direction of detection, and two separate objectives are used for illuminating the object with the light sheet and for detecting the fluorescence light emerging from the illuminated plane, respectively. In a specific design that has been particularly preferred in recent years, these two objectives are arranged in such a way that their optical axes pass through a slide plane of an object slide at an angle other than 90°, for instance 45°. The object slide may be formed by a thin glass plate, a surface thereof defining a slide plane on which the object is located. Further, the two objectives are arranged on the same side of the object slide either above or below the slide plane.

In order to obtain an overview image of the object, a light sheet microscope may be provided with a third objective which is typically located on the opposite side of the object slide with respect to the tilted objectives which are used for light sheet imaging. In this case, the third objective is oriented with its optical axis perpendicular to the slide plane on which the object is held. Such a light sheet microscope comprising three objectives is disclosed e.g. in DE 10 2016 212 020 A1.

In such a conventional configuration where the object is surrounded by objectives on both sides of the object slide, the object is mechanically difficult to access. Further, the object is viewed from opposite directions, and it is therefore mandatory that the object slide is transparent. In order to avoid this disadvantage, it would be desirable to dispense with the third objective which is specifically provided for acquiring an overview image.

For this, WO 2020/001938 A1 proposes a light sheet microscope which is suitable for obtaining an overview image without requiring a third objective. The light sheet microscope has an optical detection system comprising a detection objective, an optical axis thereof being perpendicular to an object slide. A numerical aperture of the optical detection system can be switched between high and low. A light sheet is irradiated into the sample in a direction perpendicular to the optical axis of the detection objective. In order to generate a 3D overview image, a depth of field of the optical detection system is increased by reducing the numerical aperture. However, this conventional configuration is not applicable in a scheme in which both an illumination objective and a detection objective are tilted relative to the object slide.

DE 10 2005 027 077 B4 discloses a light sheet microscope comprising a condenser which illuminates a sample with a light sheet in a direction which is oblique relative to an object slide holding the sample. This light sheet microscope further comprises a detection objective located on the opposite side of the object slide, an optical axis thereof being perpendicular to the object slide. The illuminated plane is imaged through the detection objective onto an image sensor which is tilted relative to the object slide. This approach does not allow to obtain an overview image in a configuration in which means for illumination and detection are provided on the same side of the object slide.

Further, a scheme deviating from the basic light sheet setup is the so-called oblique plane microscopy (OPM) as disclosed e.g. in WO 2010/012980 A1. In OPM, a single objective is used for both illumination and detection. According to the afore-mentioned publication, it is not possible to simply tilt a detector with respect to the optical axis of the single objective in order to compensate for the oblique orientation of the illuminated object plane due to unwanted spherical aberrations that would arise in case that the detector is tilted.

In the field of image processing, it may be envisaged to acquire a stack of images corresponding to object planes which are tilted relative to the object slide, and to perform a post-processing of these images applying algorithms for de-sharing and re-sorting of the image stack to create an overview image corresponding to an object plane which is parallel to the object slide. However, this approach requires a high computational effort without a guarantee of obtaining a synthesized image of good quality.

SUMMARY

In an embodiment, the present invention provides a light sheet microscope comprising an object slide, an optical illumination system and an optical detection system. The object slide is configured to hold an object on a slide plane. The optical illumination system includes an illumination objective configured to illuminate a first object plane of the object with a light sheet, the first object plane being oblique relative to the slide plane. The optical detection system includes a detection objective and an image sensor device. The image sensor device is configured to define a first image plane which is orthogonal to an optical axis of the detection objective and to define a second image plane which is tilted relative to the first image plane. The detection objective is configured to image a focal plane onto the first image plane and to image a second object plane of the object onto the second image plane, the focal plane being coincident with the first object plane illuminated with the light sheet, and the second object plane being parallel to or coincident with the slide plane.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the present invention provide a light sheet microscope and a method for imaging a sample which allow to obtain an overview image in a reliable and efficient manner.

According to an embodiment, a light sheet microscope comprises an object slide configured to hold an object on a slide plane, an optical illumination system including an illumination objective configured to illuminate a first plane of the object with a light sheet, said first object plane being oblique relative to the slide plane, and an optical detection system including a detection objective and an image sensor device configured to define a first image plane which is orthogonal to an optical axis of the detection objective. The detection objective is configured to image a focal plane into the first image plane, said focal plane being coincident with the first object plane illuminated with the light sheet. The image sensor device is further configured to define a second image plane which is tilted relative to the first image plane. The detection objective is configured to image a second plane of the object onto the second image plane, said second object plane being parallel to the slide plane.

The light sheet microscope allows to acquire both an image of the first object plane which is oblique to the slide plane and an image of the second object plane which is parallel to the slide plane, these images also being referred to as light sheet image and slide plane image, respectively, hereinafter. In particular, both the light sheet image and the slide plane image are formed by the same detection objective so that an additional objective specifically utilized for creating an image of the slide plane can be dispensed with. Thus, the detection objective simultaneously images two object planes which are tilted to each other onto the image planes which are defined by the image sensor device, wherein these image planes are correspondingly tilted to each other. As a result, the light sheet microscope allows to acquire both the light sheet image and the slide plane image by means of a compact design.

The proposed concept of imaging an object plane which is tilted relative the focal plane of the detection objective is compatible with conventional means which are applied for detecting a sample obliquely through an object slide as for example meniscus lenses, reservoirs, phase masks etc.

In a preferred embodiment, the image sensor device may comprise a first image sensor defining the first image plane and a second image sensor defining the second image plane. In this case, the first and second image planes are formed by light receiving layers of the respective image sensors.

According to an alternative embodiment, the image sensor device may comprise one single image sensor which is tiltable between a first position in which the light receiving layer thereof is oriented to define the first image plane, and a second position, in which the light receiving layer is oriented to define the second image plane.

Preferably, the illumination objective and the detection objective are arranged on the same side with respect to the slide plane. Locating the objectives on the same side with respect to the side plane allows to facilitate sample preparation. Further, a compact design is achieved.

The optical axis of the illumination objective may be inclined at a first tilt angle in a first range between 45° and 75° relative to an axis of the object slide which is orthogonal to the slide plane, and the optical axis of the detection objective is inclined at a second tilt angle in a second range between 15° and 45° relative to the axis of the object slide. More preferably, the first range may be from 60° to 75°, and the second range may be from 15° to 30°. According to this preferred embodiment, an asymmetrical arrangement of the objectives allows to utilize different numerical apertures for illumination and detection.

In particular, the first tilt angle may be greater than the second tilt angle. In this case, a numerical aperture of the detection objective may be determined to be greater than a numerical aperture of the illumination objective. Using a detection objective having a large numerical aperture is beneficial in terms of an optical resolution to be achieved with light sheet imaging.

In a preferred embodiment, the optical axis of the illumination objective and the optical axis of the detection objective intersect at an angle of substantially 90°, preferably 90°±5°, even better 90°±1°. Such a rectangular illumination/detection configuration enables light sheet imaging with high quality.

Preferably, the light sheet microscope comprises a third image sensor defining a third image plane which is orthogonal to the optical axis of the illumination objective. In such a case, the detection objective is configured to illuminate a third object plane with a light sheet, and the illumination objective is configured to image the third object plane onto the third image sensor. In this embodiment, the optical detection system of the light sheet microscope may include a light source which is configured to irradiate a second light sheet through the detection objective into the object. Thus, the light sheet microscope may be used according to a diSPIM (dual-view inverted selective plane illumination microscope) scheme in which two different object planes are alternately or simultaneously illuminated with two light sheets and imaged onto two different images sensors.

Advantageously, the detection objective is configured to image the second object plane onto the second image plane with an effective numerical aperture which is selected such that the second object plane is within a depth of field for imaging the first object plane illuminated with the light sheet. Specifically, the depth of field can be extended by reducing the effective numerical aperture. Accordingly, a suitable limitation of the effective numerical aperture ensures that the second object plane is located its entirety within the depth of field of the optical detection system bearing in mind that the second object plane is tilted relative to the focal plane of the detection system. Accordingly, a high-quality image of the second object plane parallel to or coincident with the object slide can be formed on the second image plane.

In a preferred embodiment, the optical detection system comprises a beam splitting device located in an optical path downstream of the detection objective. The beam splitting device is configured to branch light from the optical path towards the second image sensor for imaging the second object plane. The beam splitting device may comprise a mirror which can be selectively introduced and removed into and out of the optical path of the optical detection system. Alternatively, a dichroic beam splitter may be used in a case in which different wavelength bands are applied for light sheet imaging and overview imaging.

Preferably, the optical detection system comprises an aperture which is configured to define a light bundle for imaging the second object plane onto the second image plane. Such an aperture can be used to limit a solid angle or field of view from which the second image plane collects light for creating the image of the second object plane. In particular, the field of view may be limited such that a cone of light is utilized which is centered around an axis perpendicular to the slide plane. As a result, it is ensured that the second object plane being parallel to or coincident with the slide plane is precisely imaged onto the second image plane.

For this, the aperture may be located eccentrically with respect to the optical axis of the detection objective. In particular, the aperture may be located in a plane which is conjugate to an image-side focal plane of the detection objective.

The light sheet microscope may comprise a light source which is configured to emit illumination light for imaging the second object plane. In such a case, the light source may be located on one side of the slide plane, and the illumination objective and the detection objective may be located on the other side of the slide plane. As a result, an overview image may be obtained in a transmitted illumination light configuration.

According to another embodiment, a method is provided for imaging an object, comprising the following steps: holding the object on a slide plane; illuminating a first plane of the object with a light sheet by means of an illumination objective, said first object plane being oblique relative to the slide plane; and imaging a focal plane onto the first image plane, which is defined by a first image sensor, by means of a detection objective, said focal plane being orthogonal to an optical axis of the detection objective and coincident with the first object plane illuminated with the light sheet. A second plane of the object is imaged onto a second image plane by means of the detection objective, said second image plane being defined by a second image sensor and tilted relative to the first image plane, wherein the second object plane is parallel to or coincident with the slide plane.

Preferably, the method is performed using a light sheet microscope as described herein.

Figure 1:
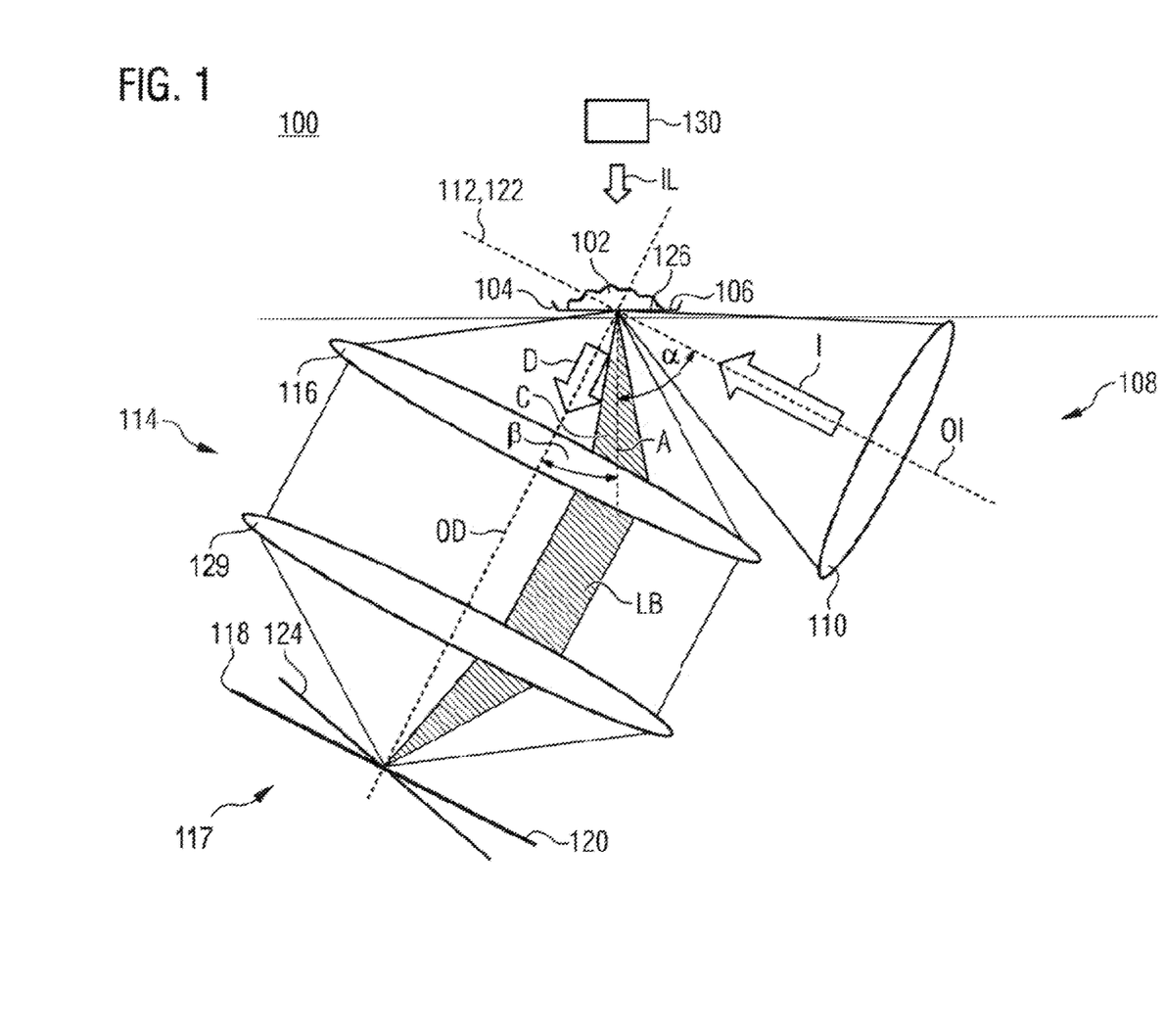
FIG. 1 is a schematic diagram of a light sheet microscope according to an embodiment.

FIG. 1 shows a schematic diagram of a light sheet microscope 100 which is configured to form an optical widefield image of an object 102 which is held on an object slide 104. The object slide 104 may be formed by a thin glass plate having a flat support surface which defines a slide plane 106 on which the object 102 is located.

The light sheet microscope 100 comprises an optical illumination system 108 which includes an illumination objective 110 configured to illuminate the object 102 with illumination light propagating along an optical axis OI which is oblique relative to the slide plane 106. The optical illumination system 108 may include a light source emitting the illumination light towards the illumination objective 110. The illumination objective 110 serves to form a light sheet from the illumination light wherein the light sheet exhibits a spatial light distribution which is approximately planar in the object region to be imaged. According to the example shown in FIG. 1, the light sheet is oriented obliquely relative to the slide plane 106 with its sheet plane being perpendicular to the drawing plane of FIG. 1. Accordingly, the light sheet formed by the illumination objective 110 illuminates a thin slice of the object 102 defining an illuminated first object plane 112.

The light sheet microscope 100 further comprises an optical detection system 114 including a detection objective 116 and an image sensor device 117 which defines a first image plane 120. According to the specific embodiment shown in FIG. 1, the image sensor device 117 includes a first image sensor 118 with a light receiving layer forming the first image plane 120. The image plane 120 of the image sensor 118 is orthogonal to an optical axis OD of the detection objective 116. The optical detection system 114 may further include a tube lens 129.

When the object plane 112 is illuminated with the light sheet by means of the optical illumination system 108 as illustrated in FIG. 1 by an arrow I, the detection objective 116 of the optical detection system 114 collects detection light emerging from the illuminated object plane 112 as illustrated in FIG. 1 by an arrow D. The optical detection system 114 is configured to image a focal plane 122 within the object 102 onto the image plane 120 of the image sensor 118. The focal plane 122 is coincident with the object plane 112 illuminated by the light sheet. Accordingly, an optical image of the illuminated object plane 112 is formed on the image plane 120 of the image sensor 118.

Thus, the configuration shown in FIG. 1 allows to acquire a light sheet image by means of the two separate objectives 110, 116 which are used for illumination and detection, respectively. Preferably, the optical axis OI of the illumination objective 110 and the optical axis OD of the detection objective 116 intersect at an angle of substantially 90°. Due to the oblique arrangement of the objectives 110, 116 relative to the slide plane 106 of the object slide 104, light sheet imaging allows an observation of object regions which are oblique relative to the slide plane 104, such an object region being represented the object plane 112 in the example of FIG. 1. Whereas observing such oblique object regions allows proper widefield imaging with well-known benefits, in particular fast imaging speed and optical sectioning, a light sheet configuration may not be suitable to acquire an image of an object region which is parallel to or coincident with the slide plane 106 of the object slide 104. Such a slide plane image may be utilized as an overview image without being limited thereto.

Therefore, as proposed herein, the image sensor device 117 of the optical detection system 114 may include a second image sensor defining a second image plane 124 which is tilted relative to the first image plane 118. It is to be noted that in FIG. 1 the second image sensor itself is omitted. Rather, FIG. 1 shows only the image plane 124 defined by the second image sensor. In particular, the image plane 124 shown in FIG. 1 may be a virtual plane which is not required to be a physical part of the second image sensor e.g. in form of a light receiving layer (as in the case of the first image sensor 118 shown in FIG. 1). The image plane 124 shown in FIG. 1 may represent a plane which is optically equivalent to the light receiving layer of the second image sensor. In other words, the second image sensor may be placed such as to generate an image signal corresponding to a distribution of light in the second image plane 124. A specific example for physically implementing the second image sensor will be given below with reference to FIG. 2.

As an alternative, the image sensor device 117 may include one single image sensor which is configured to define both the first image plane 120 and the second image plane 124. For instance, the image sensor 118 may be selectively tiltable between a first position in which the light receiving layer of the image sensor 118 is oriented to define the first image plane 120, and a second position in which the light receiving layer of the image sensor 118 is oriented to define the second image plane 124.

As illustrated in FIG. 1 by a hatched light bundle LB, the detection objective 116 is configured to image a second plane 126 of the object 102 onto the second image plane 124. The second object plane 126 is parallel to or coincident with the slide plane 106 of the object slide 104. Accordingly, the second object plane 126 is tilted relative to the first object plane 112 illuminated with the light sheet. Likewise, the second image plane 124 is correspondingly tilted relative to the first image plane 120.

As a result, the configuration shown in FIG. 1 allows to acquire both a light sheet image, i.e. an image of the object plane 112 which is oblique to the slide plane 106, and a slide plane image, i.e. an image of the second object plane 126 which is parallel to or coincident with the slide plane 106, wherein the first object plane 112 is imaged onto the first image plane 120 and the second object plane 126 is imaged onto the second image plane 124.

Figure 2:
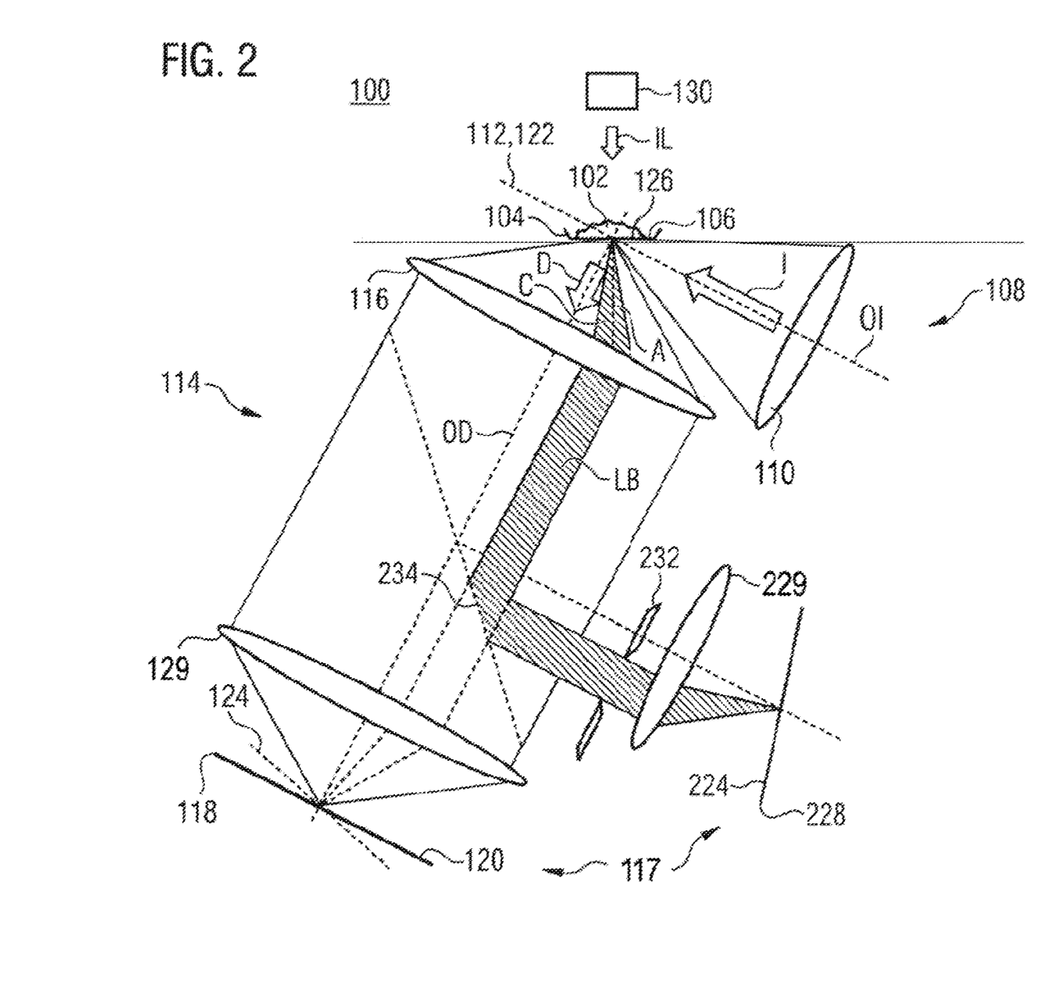
FIG. 2 is a schematic diagram illustrating a specific configuration to implement an image sensor for imaging an object plane being parallel to a slide plane.

FIG. 2 shows a specific embodiment for implementing the second image plane 124 by means of a second image sensor 228 which is utilized to form an optical image of the second object plane 126 being parallel to the slide plane 106 on which of the object 102 is located. According to this embodiment, the optical detection system 114 may comprise a beam splitting device 234 which is merely schematically depicted in FIG. 2. The beam splitting device 234 may be formed by a mirror which can be selectively introduced into the optical path of the optical detection system 114. Alternatively, the beam splitting device 234 may comprise a dichroic beam splitter which is configured to transmit detection light utilized for light sheet imaging and to reflect light utilized for creating an overview image, provided the different wavelength bands are used for light sheet and overview imaging, respectively.

According to the embodiment shown in FIG. 2, the image sensor device 117 comprises the image sensor 228 having a light receiving layer 224 which is optically equivalent to the second image plane 124. The image sensor 228 generates an image signal corresponding to a light distribution on the light receiving layer 224. The beam splitting device 234 is located in the optical path downstream of the detection objective 116 in order to branch the light bundle LB from the optical path towards the second image sensor 228. According to the present embodiment, the beam splitting device 234 is located between detection objective 116 and the tube lens 129 which is positioned in front of the second image sensor 228. As a result, the second object plane 126 being parallel to the slide plane 106 is imaged onto light receiving layer 224.

The optical detection system 114 may include an aperture 232 which is configured to define the light bundle LB which is utilized for imaging the second object plane 126 onto the light receiving layer 224 of the second image sensor 228, i.e. onto the second image plane 124 being optically equivalent thereto. The light receiving layer 224 and the image plane 124 are optically equivalent in a sense that they represent planes which are both conjugate to the same plane. As can be seen in FIG. 2, the aperture 232 is located eccentrically with respect to the optical axis OD of the detection objective 116. Preferably, the aperture 232 is shaped and located such that the aperture 232 forms a light bundle which is symmetrical about an axis A of the object slide 104, said axis A being orthogonal to the slide plane 106. For instance, the aperture 232 may have a circular shape. Due to the symmetrical shape of the aperture 232, the light bundle LB is symmetrical about the axis A, likewise. In other words, the aperture forms the light bundle LB into a cone of light C, a cone axis thereof being coincident with the axis A as shown in FIGS. 1 and 2. Thus, the aperture 232 is configured to select an angular range about the axis A to ensure that the second object plane 126 is properly imaged onto the second image plane.

Figure 3:
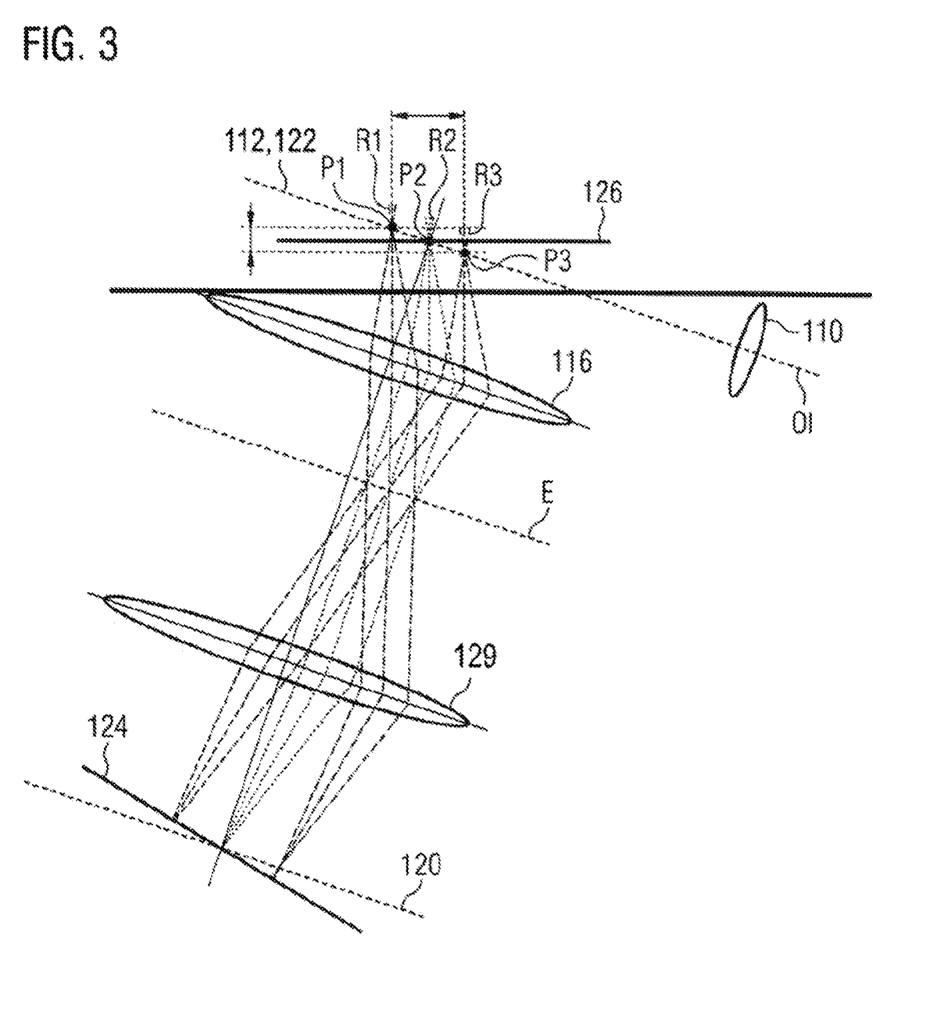
FIG. 3 is a schematic diagram illustrating a preferred position of an aperture for selecting a light bundle which is utilized for imaging the object plane parallel to the slide plane.

Further, the aperture 232 may be located in a plane which is conjugate to an image-side focal plane of the detection objective 116 as illustrated by FIG. 3 where the aforementioned plane is designated by E.

It is to be noted that an aperture element corresponding to the aperture 232 may also be present in a configuration in which the image sensor device 117 comprises only one image sensor which is tiltable to provide both the first and second image planes 120, 124 as explained above with reference to FIG. 1. In this case, the aperture may be selectively introduced into and retracted from the optical path of the optical detection system 114 in synchronization with the tilting movement of the single image sensor in order to selectively utilize the first image plane 120 for light sheet imaging and the second image plane 124 for overview imaging.

FIG. 3 shows a three light bundles R1, R2, and R3 starting from three object points P1, P2, and P3, which are located on the first object plane 112. Each light bundle R1, R2, R3 is illustrated by a chief ray and two marginal rays. As can be seen in FIG. 3, the chief rays and the marginal rays of the light bundles R1, R2, R3 intersect respectively in plane E which is conjugate to the image-side focal plane of the detection objective 116. Subsequently, the light bundles R1, R2, R3 converge onto a plane which is coincident with the second image plane 124, wherein the chief rays of the light bundles incident perpendicularly onto the second image plane 124. As a result, the second object plane 126 is imaged by light bundles such as R1, R2, R3 with only minor aberrations onto the second image plane 124 so that a suitable image of the second object plane 126 is formed.

A restriction to light bundles such as R1, R2, R3, which image the second object plane 126 with only minor aberrations, can be achieved by utilizing an aperture such as aperture 232. The aperture 232 is configured to reduce an effective numerical aperture which is utilized for imaging the second object plane 126 onto the second image plane 124. By reducing the effective numerical aperture, a depth of field of the optical detection system 114, which images the second object plane 126 onto the second image plane 124 (or the plane 224), is increased. This ensures that the object plane 126 to be imaged onto the second image plane 124 is located essentially in its entirety within the depth of field wherein the focal plane 124 being oblique relative to the second object plane is a reference for determining the depth of field. In other words, the aperture 232 enables the second object plane 126 to be included within the depth of field so that portions of the second object plane 126 which are distant from the focal plane 122 are imaged onto the second image plane 124 without causing significant aberrations. A quantitative estimation of the effective numerical aperture may made as illustrated in FIG. 4.

Figure 4:
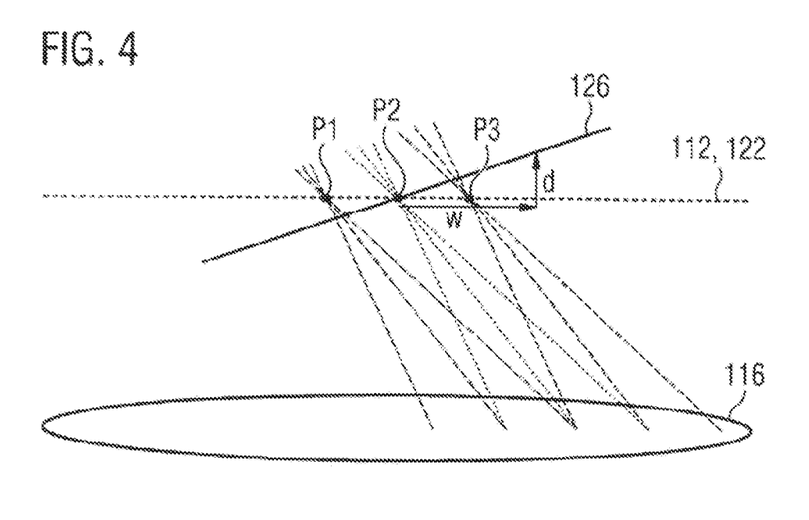
FIG. 4 is a schematic diagram illustrating a preferred depth of field of an optical detection system.

FIG. 4 illustrates a distance d of the focal plane 122, which is coincident with the first object plane 112, from the second object plane 126 which is parallel to the slide plane 106. Assumed that the optical axis OD of the detection objective 116 is inclined at a tilt angle β (see FIGS. 1 and 2) relative to the axis A which is orthogonal to the slide plane 106, the distance d is given by d=w tan β. In order to ensure proper imaging of the second object plane 126, a defocus in the amount of distance d is to be tolerated.

The depth of field is given by $\Delta z = np/(MNA) + n\lambda/NA^2$, wherein n designates a refractive index, p designates a sensor resolution, M designates a magnification of the optical detection system 114, NA designates the numerical aperture, and λ designates a light wavelength. Accordingly, the depth of field can be increased by reducing the sensor resolution, by lowering the magnification and in particular by lowering the numerical aperture which can be achieved by the aperture 232.

The light sheet microscope 100 may comprise a light source 130 which emits illumination light IL for imaging the second object plane 126 onto the second image plane 124 as illustrated in FIGS. 1 and 2. Thus, the light source 130 and the image planes 120, 124 are located on opposite sides of the slide plane 104, and the second object plane 126 is imaged onto the second image plane 124 in a transmitted illumination light configuration. When using a distinct light source as shown in FIGS. 1 and 2, directional illumination light may be utilized for creating the slide plane image. In such a case, the light source 130 is preferably located directly above the object 102, i.e. on the axis A which is perpendicular to the slide plane 106. However, the light source 130 may be located at a greater distance from the object 102 compared to an illumination objective as used in a conventional light sheet configuration which includes such a distinct illumination objective for obtaining an overview image. In particular, a diffuse light source may be used which is not required to be precisely located relative to the object 102.

An alternative approach for illuminating the slide plane 104 may be applied. For instance, in a reflected light configuration, the light source 130 may be located on the same side as the image planes 120, 124. Further, illumination light for obtaining the slide plane image may also be supplied without any light source specifically provided for this purpose. Rather, the illumination light may be emitted onto the slide plane 104 through the illumination objective 110 by means of the light source which is already provided for generating the light sheet. Further, non-coherent light or coherent, collimated light may be applied.

As already mentioned above, the illumination objective 110 and the detection objective 116 are preferably oriented such that the optical axis OI, OD thereof intersect at an angle of substantially 90°. Further, a symmetrical configuration may be selected in which both optical axis OI, OD are inclined at an angle of 45° with respect to the axis A of the slide plane 106. Alternatively, an asymmetrical configuration may be applied in which the aforementioned tilt angles differ from each other. For instance, the optical axis OI of the illumination objective 110 may be inclined at a first angle α in a range between 45° and 75° relative to the axis A of the object slide 104, and the optical axis OD all the detection objective 116 may be inclined at a second angle β in a range between 15° and 45° relative to the axis A of the object slide 104. The lower limits and the upper limits of the angular ranges mentioned above add to substantially 90°.

By selecting the angle α to be larger than the angle β, a solid angle representing a field of view of the detection objective 116 can be larger than a solid angle covered by the illumination objective 110. Accordingly, a numerical aperture of the detection objective 116 may be determined to be greater than a numerical aperture of the illumination objective 110. Such an asymmetrical configuration is specifically preferred in a case in which the optical detection system is designed to achieve a high-resolution light sheet imaging.

According to the embodiment shown in FIGS. 1 and 2, the illumination objective 110 and the detection objective 116 are arranged both on the same side with respect to the slide plane 106. According to the present embodiment, both objectives 110, 116 are located below the object slide 104. However, the objectives 110, 116 may also be provided above the object slide 104. Locating the objectives 110, 116 on the same side with respect to the side plane 104, enables a compact design.

Figure 5:
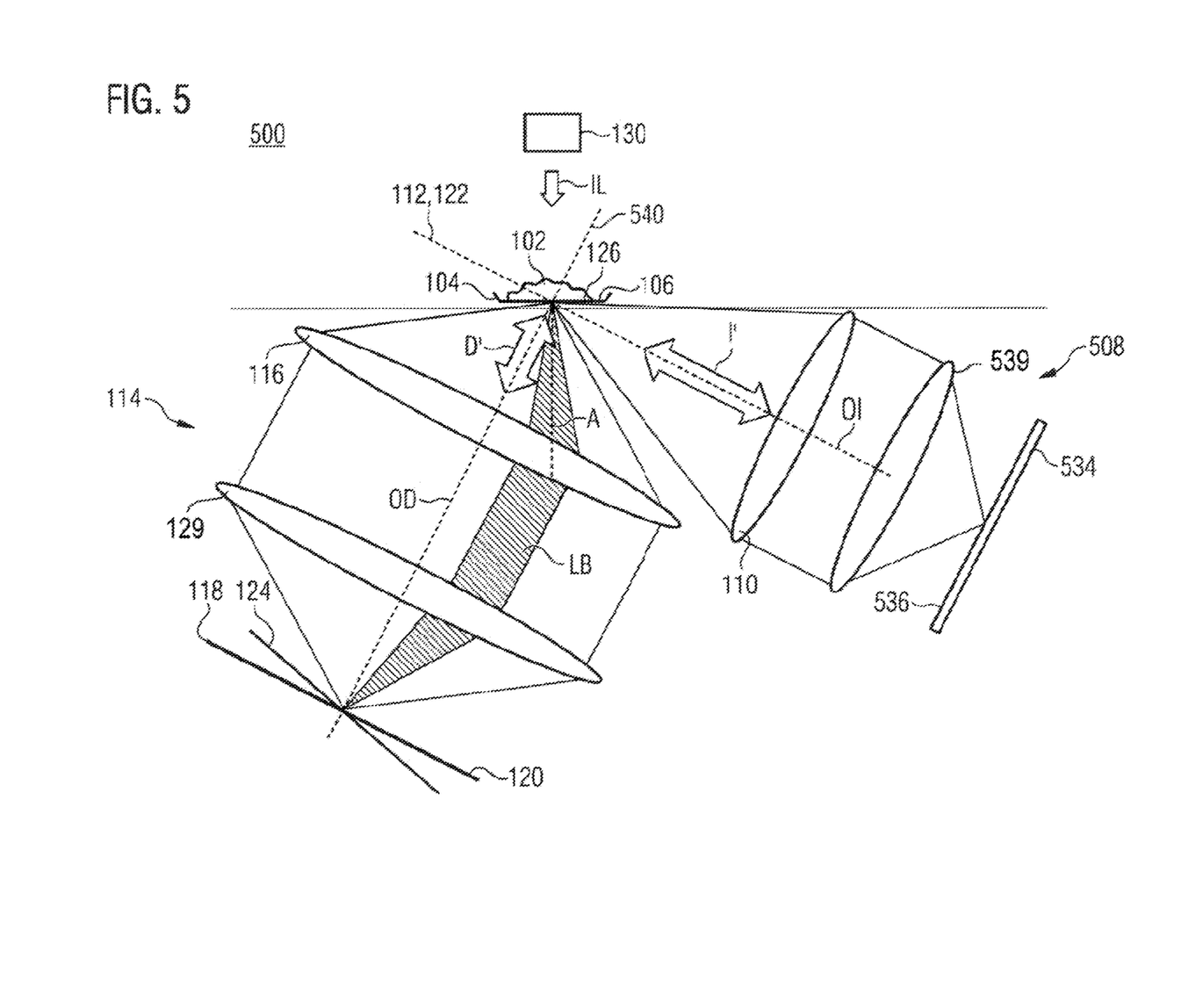
FIG. 5 is a schematic diagram of a light sheet microscope according to another embodiment.

FIG. 5 is a schematic diagram showing a light sheet microscope 500 according to a modified embodiment. The embodiment of FIG. 5 may be advantageously applied to a diSPIM configuration which allows dual views of the object 102 through the objectives 110, 116.

As a main difference to the embodiment shown in FIGS. 1 and 2, the light sheet microscope 500 comprises a modified optical illumination system 508 which includes a third image sensor 534 having a third image plane 536. In addition, the optical illumination system 508 may comprise a tube lens 539. Further, the optical detection system 114 of the light sheet microscope 500 may be modified to include a light source which is configured to irradiate a second light sheet along the optical axis OD into the object 102.

The light sheet microscope 500 shown in FIG. 5 is configured to illuminate the object 102 with two light sheets and to form two images of the object planes which are illuminated with the respective light sheets onto the image planes 120 and 536, respectively. More concretely, in a first step, the light sheet microscope 500 may be operated to illuminate the first object plane 112 by means of the illumination objective 110 with a first light sheet and to image the illuminated object plane 112 by means of the detection objective 116 onto the first image plane 120 of the first image sensor 218. In a second step, the light may be operated to illuminate a third object plane 540 of the object 102 by means of the detection objective 116 with a second light sheet and to image the illuminated object plane 540 by means of the illumination objective 110 onto the third image plane 536 provided in the optical illumination system 508.

Thus, each of the objectives 110, 116 of the light sheet microscope 500 can be used for both light sheet illumination and detection as illustrated in FIG. 5 by double arrows I' and D', respectively. The above-mentioned steps for illuminating and imaging the first and second object planes 112, 540 by means of the first and second objectives 110, 116 may be performed alternately or simultaneously.

As used herein the term "and/or" includes any and all combinations of one or more of the associated listed items and may be abbreviated as "/".

Although some features have been described in the context of an apparatus, it is clear that these features also represent a description of the corresponding method, where a block or device corresponds to a method step or a feature of a method step. Analogously, features described in the context of a method step also represent a description of a corresponding block or item or feature of a corresponding apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 light sheet microscope
102 object
104 object slide
106 light plane
108 optical illumination system
110 illumination objective
112 first object plane
114 optical detection system
116 detection objective
117 image sensor device
118 first image sensor
120 first image plane
122 focal plane
124 second image plane
126 second object plane
129 tube lens
130 light source
224 light receiving layer
228 image sensor
229 tube lens
232 aperture
234 beam splitting device
500 light sheet microscope
508 optical illumination system
534 image sensor
536 image plane
539 tube lens
540 object plane
OI, OD optical axis
LB light bundle
P1, P2, P3 object point
R1, R2, R3 light bundle
α, β angle

The invention claimed is:

1. A light sheet microscope, comprising:
an object slide configured to hold an object on a slide plane;
an optical illumination system including an illumination objective configured to illuminate a first object plane of the object with a light sheet, the first object plane being oblique relative to the slide plane; and
an optical detection system including a detection objective and an image sensor device, the image sensor device being configured to define a first image plane which is orthogonal to an optical axis of the detection objective and to define a second image plane which is tilted relative to the first image plane, the detection objective being configured to image a focal plane onto the first image plane and to image a second object plane of the object onto the second image plane, the focal plane being coincident with the first object plane illuminated with the light sheet, and the second object plane being parallel to or coincident with the slide plane.

2. The light sheet microscope according to claim 1, wherein the image sensor device comprises a first image sensor defining the first image plane and a second image sensor defining the second image plane.

3. The light sheet microscope according to claim 1, wherein the illumination objective and the detection objective are arranged on a same side of the slide plane.

4. The light sheet microscope according to claim 1, wherein an optical axis of the illumination objective is inclined at a first tilt angle in a range between 45° and 75° relative to an axis of the object slide which is orthogonal to the slide plane, and wherein the optical axis of the detection objective is inclined at a second tilt angle in a range between 15° and 45° relative to the axis of object slide.

5. The light sheet microscope according to claim 4, wherein the first tilt angle is greater than the second tilt angle.

6. The light sheet microscope according to claim 1, wherein a numerical aperture of the detection objective is greater than a numerical aperture of the illumination aperture.

7. The light sheet microscope according to claim 1, wherein an optical axis of the illumination objective and the optical axis of the detection objective intersect at an angle of substantially 90°.

8. The light sheet microscope according to claim 2, further comprising a third image sensor defining a third image plane which is orthogonal to an optical axis of the illumination objective, wherein the detection objective is further configured to illuminate a third object plane with a light sheet, and wherein the illumination objective is further configured to image the third object plane onto the third image plane.

9. The light sheet microscope according to claim 1, wherein the detection objective is configured to image the second object plane onto the second image plane with an effective numerical aperture which is selected such that the second object plane is within a depth of field for imaging the first object plane illuminated with the light sheet.

10. The light sheet microscope according to claim 1, wherein the optical detection system comprises a beam splitter located in an optical path downstream of the detection objective, the beam splitter being configured to branch light from the optical path towards the second image plane for imaging the second object plane.

11. The light sheet microscope according to claim 1, wherein the optical detection system comprises an aperture configured to define a light bundle for imaging the second object plane onto the second image plane.

12. The light sheet microscope according to claim 11, wherein the aperture is located eccentrically with respect to the optical axis of the detection objective.

13. The light sheet microscope according to claim 11, wherein the aperture is located in a plane which is conjugate to an image-side focal plane of the detection objective.

14. The light sheet microscope according to claim 1, further comprising a light source configured to emit illumination detection light for imaging the second object plane.

15. The light sheet microscope according to claim 14, wherein the light source is located on one side of the slide plane, and wherein the illumination objective and the detection objective are located on an opposite side of slide plane.

16. A method for imaging an object, the method comprising:
    holding the object on a slide plane;
    illuminating a first object plane of the object with a light sheet by an illumination objective, the first object plane being oblique relative to the slide plane;
    imaging a focal plane onto a first image plane by a detection objective, the focal plane being orthogonal to an optical axis of the detection objective and coincident with the first object plane illuminated with the light sheet; and
    imaging a second object plane of the object onto a second image plane by the detection objective, the second image plane being tilted relative to the first image plane, and the second object plane being parallel to or coincident with the slide plane.

* * * * *